J. A. ECCLES AND B. F. TOZIER.
GEAR SHIFT FOR AUTOMOBILES.
APPLICATION FILED JUNE 13, 1917.
1,321,423.
Patented Nov. 11, 1919.
5 SHEETS—SHEET 1.
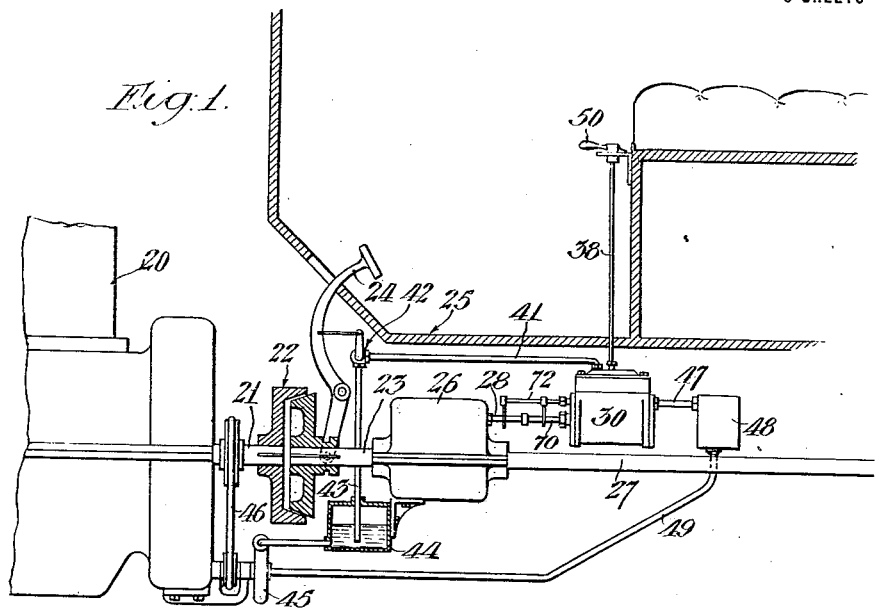
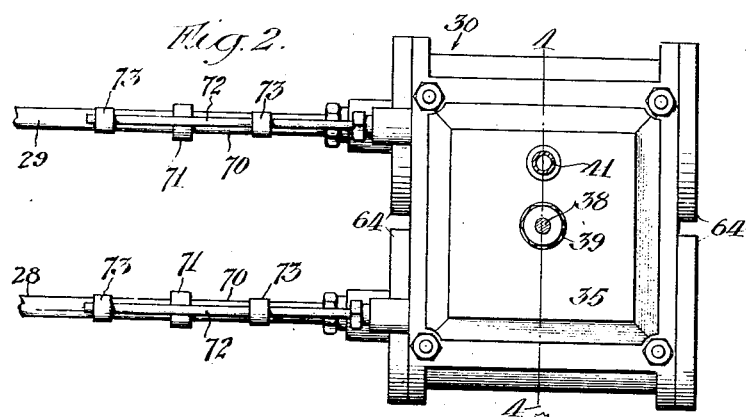
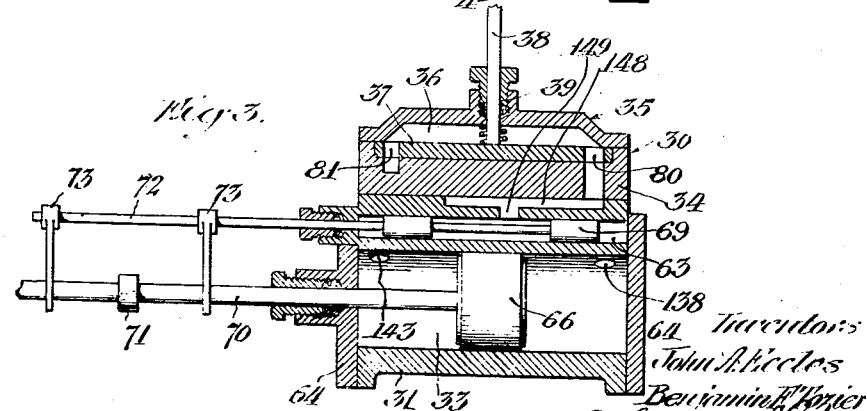

J. A. ECCLES AND B. F. TOZIER.
GEAR SHIFT FOR AUTOMOBILES.
APPLICATION FILED JUNE 13, 1917.

1,321,423.

Patented Nov. 11, 1919.
5 SHEETS—SHEET 2.

J. A. ECCLES AND B. F. TOZIER.
GEAR SHIFT FOR AUTOMOBILES.
APPLICATION FILED JUNE 13, 1917.
1,321,423.
Patented Nov. 11, 1919.
5 SHEETS—SHEET 3.
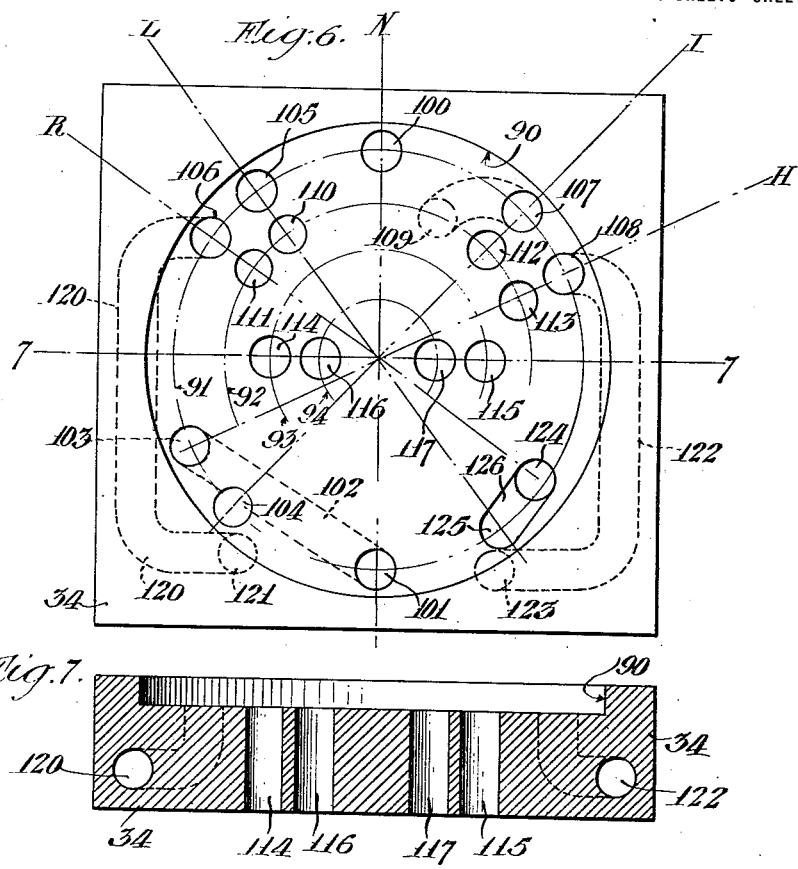
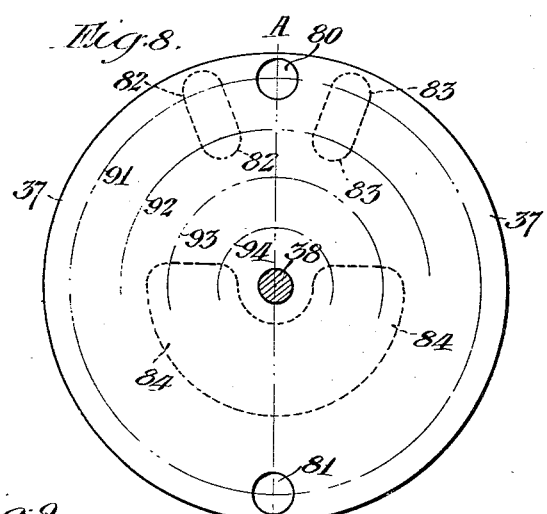
Inventors
John A. Eccles
Benjamin F. Tozier
by Graham + Lanier
Attorneys

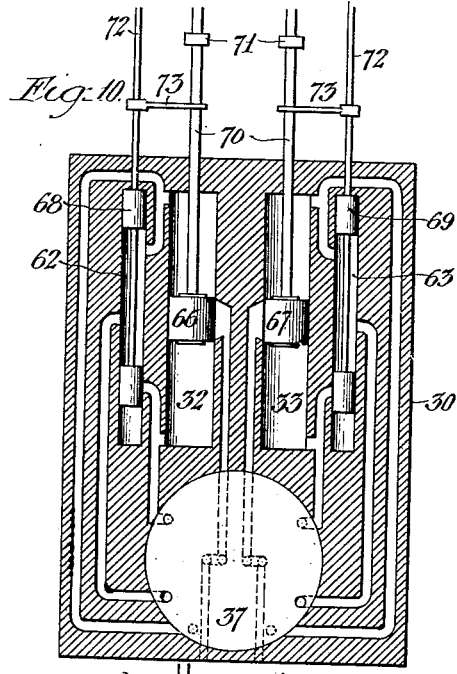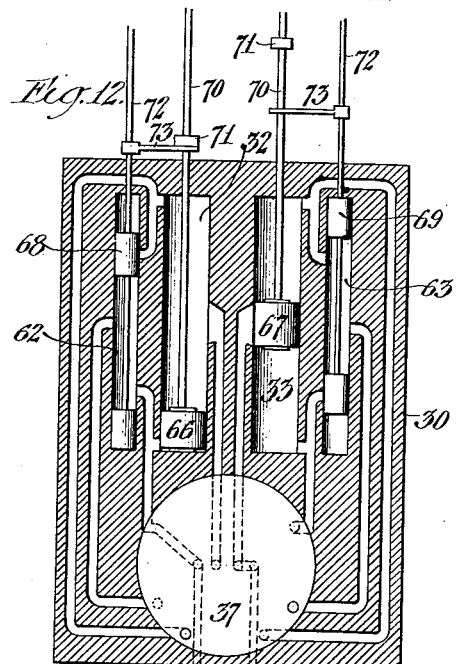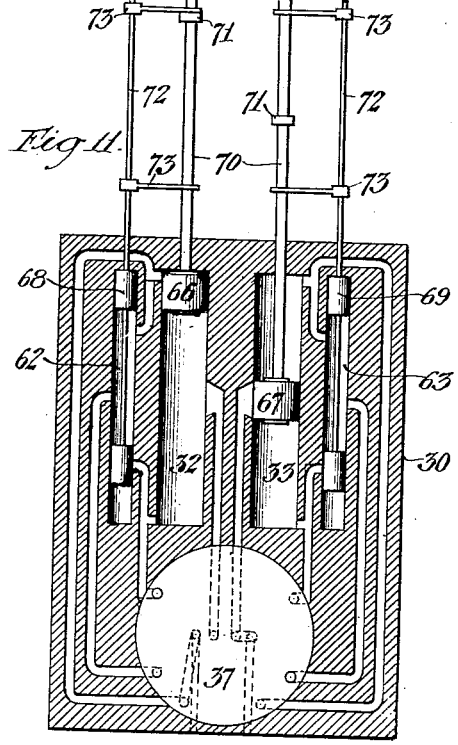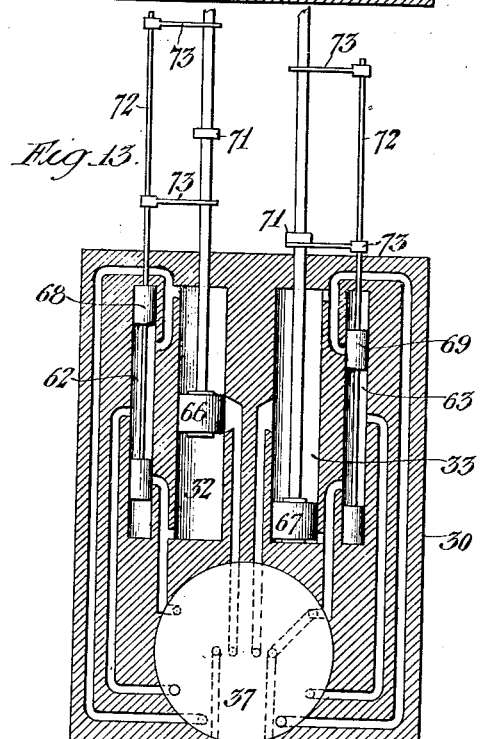

J. A. ECCLES AND B. F. TOZIER.
GEAR SHIFT FOR AUTOMOBILES.
APPLICATION FILED JUNE 13, 1917.
1,321,423.
Patented Nov. 11, 1919.
5 SHEETS—SHEET 5.
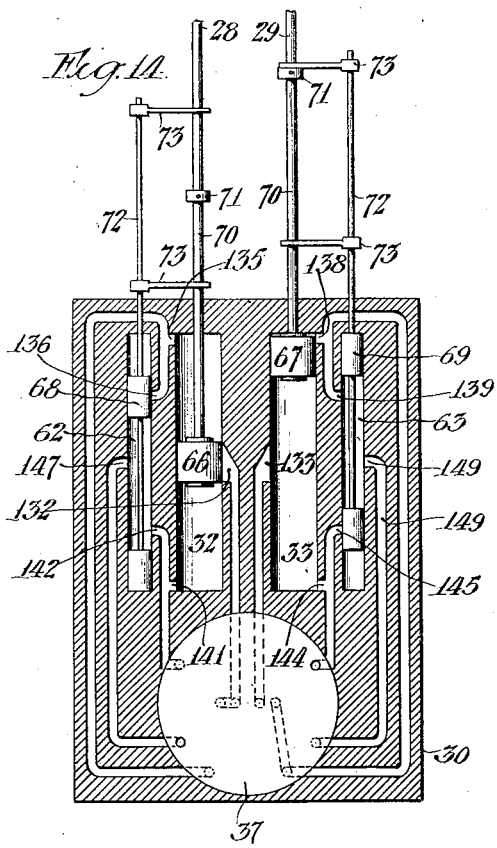
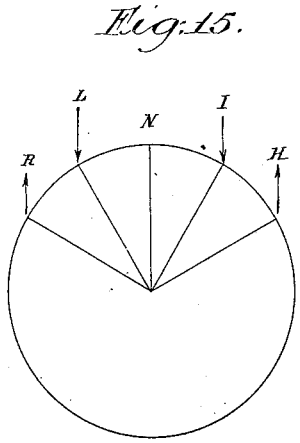
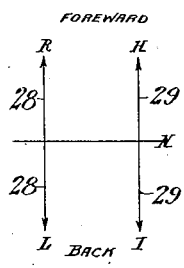
Inventors
John A. Eccles
Benjamin F. Tozier
by Graham + Xavier
Attorneys

UNITED STATES PATENT OFFICE.

JOHN A. ECCLES AND BENJAMIN F. TOZIER, OF VENICE, CALIFORNIA.

GEAR-SHIFT FOR AUTOMOBILES.

1,321,423.  Specification of Letters Patent.  Patented Nov. 11, 1919.

Application filed June 13, 1917. Serial No. 174,600.

*To all whom it may concern:*

Be it known that we, JOHN A. ECCLES and BENJAMIN F. TOZIER, both citizens of the United States, residing at Venice, in the county of Los Angeles and State of California, have invented a new and useful Gear-Shift for Automobiles, of which the following is a specification.

Our invention relates to the automobile art, and more particularly to the gear shift used in that art. In one of the principal standard forms of automobile an internal combustion engine is provided, this internal combustion engine driving the gear wheels through a propeller shaft which is connected through a transmission gear system and a clutch.

In the commonest form of this type of automobile, four gear changes are provided, one of these serving to reverse the direction of the automobile, and the other three being forward speeds, commonly designated as low, intermediate and high.

The method of operation of the standard gear shift is as follows:

When it is desired to change from one gear ratio to another, the driver of the automobile kicks out the clutch with his foot by means of a clutch pedal, and while the engine is entirely disengaged he throws the desired set of gears into engagement by means of a manually operated gear lever. Such a method of operating an automobile is somewhat unsatisfactory for the reason that it requires the operator to remove one hand from the steering wheel whenever he desires to change the gear ratio.

Our invention is designed to provide a power operated arrangement for the hand lever, above referred to, and to further provide mechanism whereby the operator can set selective means for throwing the gears before he desires to actually change them, the actual operation of changing the gears being accomplished whenever the clutch is thrown out of engagement by the driver. By providing such an arrangement, the driver can devote his entire attention to steering the automobile, the gears being shifted automatically to whatever ratio he has previously set his selective means.

A further object of our invention is to provide a mechanism having the above characteristics, in which a fluid pressure is used to actually shift the gears. By the term "fluid pressure" we intend to designate any liquid or gas under pressure. In the following specification we will, however, limit ourselves to the description of a liquid operated mechanism, and for the sake of clearness we will limit ourselves to a mechanism operated by oil under pressure. We have found that oil under pressure is very convenient for use in mechanism of this character, but do not wish to limit ourselves except as indicated in the following claims.

A further object of our invention is to provide a mechanism of the above described character which will be applicable to the present types of automobiles without radical changes in the gear systems employed therein.

Further objects and advantages will be made evident hereinafter.

Referring to the drawings, which are for illustrative purposes only:

Figure 1 is a side elevation of a portion of an automobile equipped with our invention.

Fig. 2 is a plan view of a portion of the mechanism shown in Fig. 1, this mechanism being shown on an enlarged scale.

Fig. 3 is a side view, partly in section, of the mechanism shown in Fig. 2.

Fig. 6 is a plan view of the valve deck.

Fig. 7 is a section of the valve deck on line 7—7 Fig. 6.

Fig. 8 is a plan view of the disk valve.

Fig. 9 is a side elevation of the disk valve.

Fig. 10 is a diagrammatic view of the various parts in the neutral position.

Fig. 11 is a similar view with the parts in the reverse position.

Fig. 12 is a similar view with the parts in the low position.

Fig. 13 is a similar view with the parts in the intermediate position.

Fig. 14 is a similar view with the parts in the high position.

Fig. 15 is a diagrammatic view showing the various positions of the valve.

Fig. 16 is a diagrammatic view showing the direction of motion for operating the change gears.

Figure 4:
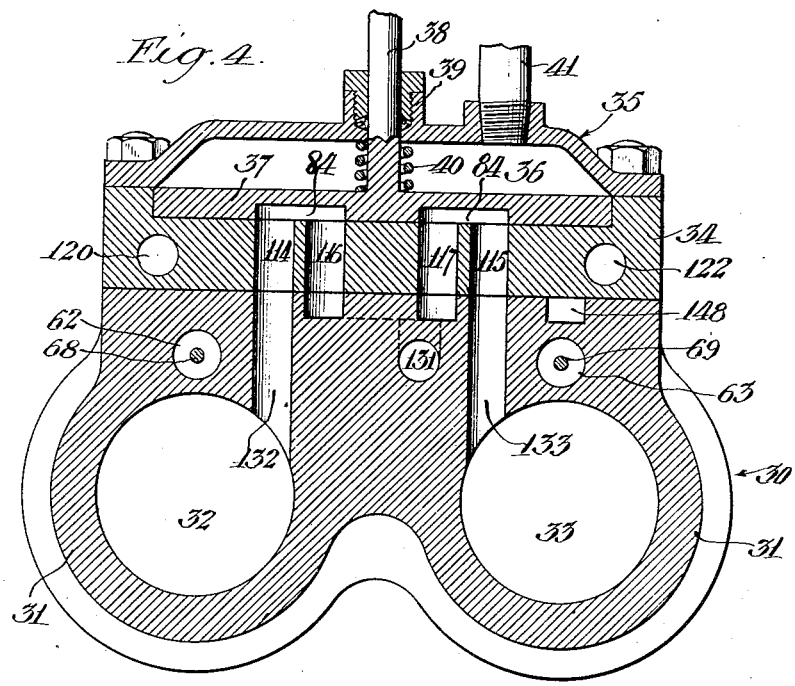
Fig. 4 is a full size section through the mechanism shown in Fig. 2 on the line 4—4 of that figure.

In the form of the invention illustrated in these drawings, a portion of an automobile engine 20 is shown, this engine being provided with an engine shaft 21, a clutch 22, and a clutch shaft 23 which may be connected to the engine shaft 21 through the clutch 22. The clutch 22 is normally held in engagement by a clutch pedal 24 which extends through the floor of the automobile 25 in a position convenient to the foot of the operator. The clutch shaft 23 is connected into a transmission or gear box 26 in which suitable standard change gears are placed, so that the clutch shaft can be connected to a propeller shaft 27 in various ratios. The propeller shaft 27 drives the rear wheels through mechanism not shown. The change gear box 26 is provided with two operating rods 28 and 29 which are moved forward and backward, as shown in Fig. 16, to accomplish the gear changes. Thus the forward movement of rod 28 throws the reverse gear into play, and the backward movement throws the low gear into play. In the same way, the forward movement of the rod 29 throws the high gear into play and the backward movement throws the intermediate gear into play. It is, of course, understood that with the gears in their central position they are disengaged, and when the gears are disengaged the transmission is said to be in the neutral position.

For the purpose of operating the rods 28 and 29, we provide a gear shifting mechanism 30. This mechanism, as illustrated, consists of a cylinder casting 31 having cylinders 32 and 33 provided therein. Clamped to the top of the cylinder casting 21 is a valve deck 34 which is provided with a valve cover 35 forming an airtight valve chamber 36, in which a flat disk valve 37 is placed, this valve having a valve stem 38 extending through a suitable stuffing box 39 in the cover 35, being provided with a spring 40 which tends to hold it seated on the top of the valve deck 34, the lower surface of the valve 37 and the upper surface of the valve deck 34 being machined to provide a tight fit therebetween. An oil supply pipe 41 connects into the valve chamber 36, this pipe being connected into a valve 42 which is controlled by the pedal 24, so that whenever the pedal is in the rearward position the clutch is engaged and the valve 42 is closed. The valve 42 is provided with oil under pressure through a pipe 43 from a closed tank 44, this tank having a body of oil in the bottom thereof and having air under pressure in the top thereof. This pressure is maintained by a pump 45 driven by a belt 46 from some moving portion of the engine. The exhaust openings of the mechanism 30 are connected through a pipe 47 with a tank 48 from which the pump 45 draws oil through a pipe 49. The valve stem 38 extends through the automobile and is provided with a suitable operating lever 50, as shown in Fig. 1.

Formed in the cylinder casting 31, above the cylinders 32 and 33, as shown in Fig. 4, are valve openings 62 and 63, these valve openings being cylindrical and extending through the cylinder casting and being closed at their front end and provided with a stuffing box through which their valve rods pass and being closed at their rear ends by heads 64 which also serve to close the ends of the cylinders 32 and 33. Sliding freely in the cylinders 32 and 33 are pistons 66 and 67, and sliding freely in the openings 62 and 63 are piston valves 68 and 69. The pistons 66 and 67 are provided with rods 70 which connect to the rods 28 and 29 respectively of the gear shift, the rods 70 being provided with collars 71. The valves 68 and 69 are provided with valve rods 72 which have fingers 73 secured thereon, these fingers being forked and extending out and engaging the rods 70 in such a position as to be struck by the collars 71, as will be explained hereinafter.

For the purpose of directing the above instrumentalities, a somewhat complicated system of oil ports is necessary in the cylinder casting 31, valve deck 34 and the valve 37.

These ports will now be described:

Referring to Fig. 8, which shows the disk valve 37, as viewed from above, the valve stem 38 is shown in section, and a front primary pressure port 80 and a rear primary pressure port 81 are shown, these ports extending completely through the valve and being located diametrically opposite from each other on a reference line A—A. Cut in the under surface of the valve is a left exhaust by-pass cavity 82 and a right exhaust by-pass cavity 83, these cavities being simply depressions cut up into the under surface of the valve, so that oil can flow radially therein. A valve exhaust cavity 84 is similarly cut in the bottom of the valve, this cavity extending around something more than a semi-circle. The valve deck 34, shown in Fig. 6, is viewed in the same relationship as the valve 37, shown in Fig. 8, and has a central cylindrical depression 90 into which the valve 37 fits. The ports in the valve 37, the valve deck 34, and the casting 31 are located on four concentric cylinders, the circles of which on the various surfaces may be designated by the numerals 91, 92, 93 and 94 in their order from the circumference inward. Located in the valve deck 34 on the circle 91, and diametrically opposite each other, are a right valve port 100 and a left valve port 101, the right valve port 100 extending completely through the valve deck 34 and the left valve port 101 extending only partly through and being connected to an opening 102 with a port 103 located on the same circle and which extends completely through the valve deck 34. A port 104 on the circle 91 also connects with the opening 102 and the port 103. Located on the circle 91 to the left of the port 100 are a left front port 105 and a left rear port 106. Located to the right of the right valve port 100 on the circle 91 are a right front port 107 and a right rear port 108. The left front port 105 extends completely through the valve deck 34, and the right front part 107 also extends completely through the valve deck 34 in a somewhat distorted direction, as indicated by the dotted port 109 in Fig. 6. The port 106 extends only partly through the valve deck 34 and communicates through a passage 120 with a port 121 on the under side of the valve deck 34. In a similar manner the port 108 extends only partly through the valve deck 34 and communicates with a passage 122 with a port 123 on the under side of the valve deck 34. Located on the same radial lines as the ports 105, 106, 107 and 108 are secondary exhaust ports 110, 111, 112 and 113, these ports extending completely through the valve deck 34 and being located on the circle 92. Located on the circle 93, diametrically opposite to each other, and 90° from the ports 100 and 101, are secondary exhaust ports 114 and 115, and located on the same radius on the circle 94 are secondary exhaust ports 116 and 117, the ports 114 to 117 extending completely through the valve deck 34. A port 125 is provided extending partly through the valve deck 34 and communicating through a passage 126 with a port 124 which extends completely through the valve deck 34.

Figure 5:
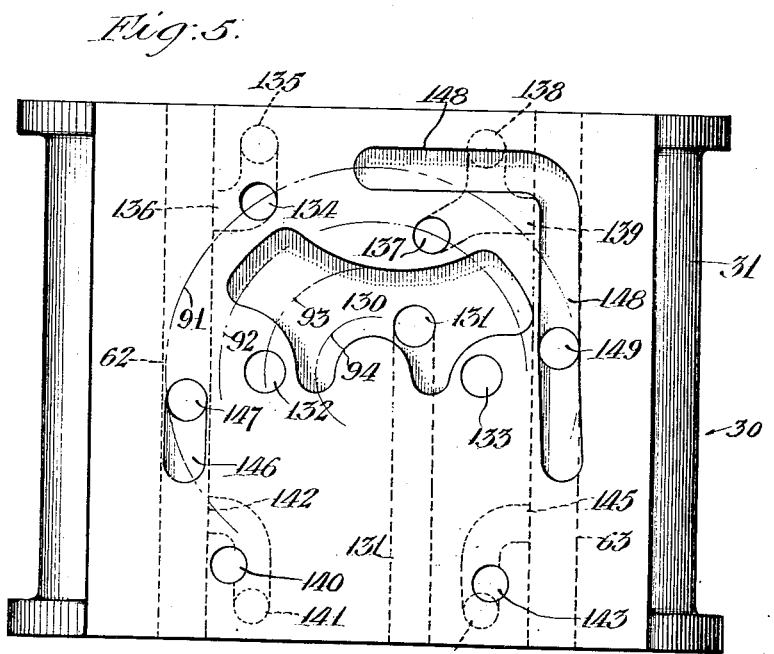
Fig. 5 is a plan view showing the top of the cylinder casting.

The valve deck shown in Fig. 6 is secured to and rests upon the top of the cylinder casting 31, which is shown in Fig. 5 in the same relationships as Fig. 6 and Fig. 8. Formed in the center of the cylinder casting 31 is a main exhaust cavity 130 which has the form shown and which connects through a main exhaust port 131 with the exhaust pipe 47. Located on the circle 93 are central cylinder ports 132 and 133, these ports extending down and connecting with the centers of the cylinders 32 and 33, respectively. Located on the circle 91 is a left front port 134, this port registering with the port 105 and extending down to ports 135 and 136, the port 135 connecting with the front end of the cylinder 32, and the port 136 connecting with the front end of the valve cavity 62. Located on the circle 92 is a right front port 137 which registers with the port 109, this port extending down and connecting through a port 138 with the front of the cylinder 33 and through a port 139 with the front of the valve cavity 63. Registering with the port 121 is a left rear port 140 which connects through a port 141 with the rear of the cylinder 32 and through a port 142 with the rear of the valve cavity 62. Registering with the port 123 is a right rear port 143, this port connecting through a port 144 with the rear of the cylinder 33 and through a port 145 with the rear of the valve cavity 63. A groove 146 registers with the port 103 and extends over to a port 147 connecting with the center of the valve cavity 62. A groove 148 is cut in the top of the cylinder casting 31, connecting the port 100 and the port 124 with a port 149 which extends down and connects with the middle of the valve cavity 63.

It will be noted that in Fig. 6 certain radial lines are marked R, L, N, I and H to correspond with the markings in Fig. 15. It will also be noted that the valve shown in Fig. 8 has a central line marked A—A for reference purposes.

The method of operation of the invention is as follows:

The pump 45 is driven continuously whenever the engine 20 is in operation, and draws oil from the tank 48, forcing it into the tank 44, thus compressing the air in the top and providing the necessary constant pressure necessary to the successful operation of a device of this kind. The oil under pressure tends to pass through the pipe 43 into the pipe 41, but is normally prevented from so doing by the valve 42 being closed. Whenever the operator wishes to make a change in his gear ratios, he operates the valve 37 through the valve stem 38 by means of the handle 50. The valve 37 is readily moved when the oil pressure is shut off by the valve 42, and may be placed with the line A—A registering with any of the lines R, L, N, I or H of the valve deck 34, the mere operation of the valve accomplishing nothing, the actual shifting of the parts being accomplished whenever the valve 42 is opened, which occurs whenever the clutch is released. Whenever the valve 42 is opened, oil under pressure is admitted through the pipe 41 into the valve chamber 36, this pressure acting upon the top of the valve 37, forcing it tightly against its seat, the pressure being sufficient to prevent any manual operation of the valve during this time. In each of the positions of the valve certain movements of the mechanisms will take place, these movements being explained in their order, as follows:

With the line A—A registering with the line N, the ports 80 and 81 are in communication with the ports 100 and 101. Pressure from the port 100 flows through the groove 148 and through the port 149 into the center of the valve cavity 63. At the same time, pressure through the ports 81 and 101 flows through the opening 102 and the port 103 into the ports 146 and 147 and into the center of the valve cavity 62. At the same time, the ports 114 and 116 and the ports 117 and 115 are connected together through the valve exhaust cavity 84, thus connecting the central cylinder ports 132 and 133 with the main exhaust cavity 130. As a result, oil under pressure is admitted to the center of both of the piston cavities 62 and 63, and the central ports 132 and 133 of each of the main cylinders 32 and 33 are connected so that they can exhaust. In this position, the mechanism tends to throw the gearing into its neutral position regardless of what the previous condition of the mechanism may have been. For example, with the parts as shown in Fig. 14, the mechanism would previously have been in high. The piston 67 in passing to the front end of the cylinder would have moved the rod 70 so that the collar 71 striking on one of the arms 73 would have forced the valve 69 into its forward position, as shown. Whenever the port 149 is open to pressure, as previously explained, oil under pressure would flow into the center of the valve cavity 63. The piston 69 being in its extreme forward position, the port 139 is open and this oil under pressure flows through the port 139 and the port 138 into the front of the cylinder 33, thus forcing the piston 67 backward, the oil displaced from the rear of the piston 67 flowing through the central port 133, ports 115 and 117 and the valve exhaust cavity 84 into the main exhaust cavity 130, and through the main exhaust port 131 into the pipe 47. During this time, the port 145 is closed by the piston 69. Whenever the piston 67 reaches the middle of the cylinder, thus closing the port 133, the piston is stopped due to the pocketing of the oil in the rear end of the cylinder 33. As this oil is incompressible, and has no outlet, the piston cannot move past the center. The parts are then in the position shown in Fig. 10, and it is possible for the operator to move the valve 37 from the neutral position, or to any position desired. Such movement of the valve as previously explained accomplishes nothing until the clutch is operated.

Suppose, for example, that the operator wishes to throw the gears into the reverse position. He moves the valve 37 so that the line A—A corresponds with the line R of Fig. 6. Whenever the clutch is operated, the pressure flows through the port 80 into the port 106, flowing through the opening 120 and the port 121 into the port 140, and through the port 141 into the rear of the left cylinder 32. At the same time, the ports 105 and 110 are connected through the right exhaust by-pass cavity 83, the port 110 communicating with the main exhaust cavity 130 and from thence through the main exhaust port 131 to the pipe 47. The port 105 being connected through the port 134, and the port 135 with the front of the cylinder 32, it is possible for the piston 66 to move to its extreme forward position, as shown in Fig. 11, this movement moving the valve 68 to its forward position unless it is already in this position.

If it is desired to throw the gears to their neutral position, this can be readily done by moving the valve back to the position N—N and throwing out the clutch. If it is desired to go directly from the reverse into low, the valve 37 is thrown until the line A—A corresponds with the line L, Fig. 6, thus connecting the port 105 through the port 80 with pressure, and connecting the port 106 through the left exhaust by-pass cavity 82 with the port 111, which is connected to the exhaust. This throws pressure through the port 134 and port 135 into the front of the left cylinder 32, and at the same time connects the rear of that cylinder through the port 141 and port 140 and the port 121 and opening 120. The piston 66 can, therefore, move the whole length of the cylinder into the position shown in Fig. 12, the valve 68 being moved to the rear of the cylinder by means of a finger 73 and a collar 71.

If it is desired to make either a forward or reverse movement on the right hand cylinder, this being accomplished as shown in Fig. 13 and Fig. 14, it can readily be done by turning the valve so that the line A—A corresponds with the line I or H of Fig. 6.

If the operator should so place the valve as to call for a shifting of the gears by the right hand cylinder when the gears of the left hand cylinder are engaged, it is necessary that the gears in the engaged cylinder be thrown out of mesh before the gears in the other cylinder are thrown in. This is accompished by making the ports entering and leaving the valve chambers 62 and 63 very much larger than the other valve ports of the system. This results in the engaged piston being thrown out much more quickly than the disengaged piston can be operated.

Suppose, for example, it is desired to go from the low position shown in Fig. 12 to the intermediate position shown in Fig. 13. To accomplish this, the piston 66 must be thrown to its central position, and the piston 67 must be thrown to its rear position. The valve 37 having been moved to the position I, the port 107 is connected to pressure through the port 80, this pressure being transmitted through the port 109 to the port 137, and through the port 138 to the front of the cylinder 33. At the same time, the ports 113 and 108 are connected together through the by-pass cavity 83, thus connecting the rear of the cylinder 33 with the exhaust pipe 47. At the same time, however, the port 81 also delivers pressure through the port 104 to the port 103, and through the port 103 into the port 147, connecting with the center of the valve cavity 62. The valve 68 being in its extreme rear position, the port 142 is open and pressure flows through the port 142 and the port 141 into the rear of the cylinder 32. This forces the piston forward into the central position, as the ports 114 and 116 are connected through the valve exhaust cavity 84, and the central cylinder port 132 is therefore connected to the exhaust. The forward movement of the piston 66 is, however, arrested whenever it covers the port 132, as the front end of the cylinder 32 is entirely closed and the oil therein is incompressible.

It is not thought necessary to describe in detail the various other operations, the position of the parts being shown in the diagrams, Figs. 10 to 14 inclusive.

We claim as our invention:—

1. An operating device for throwing a rod into any one of three positions comprising a cylinder having a port at either end and one in the center; a piston moving in said cylinder connected to said rod; valve means for opening either end port to pressure and for simultaneously opening either the other end port or the central port to exhaust.

2. An operating device as specified in claim 1 also comprising an auxiliary valve operated by the piston and so arranged as to close either of said end ports as said piston approaches the other end of said cylinder from said end port.

3. An operating device for throwing a rod into a central position from either of two end positions comprising a cylinder having a port at either end and one in the center; a piston moving in said cylinder and mechanically connected to said rod; walls forming an auxiliary valve chamber having a primary port and two secondary ports connected to either end of said cylinder; a valve in said chamber; and means by which said piston as it approaches the end of its stroke actuates said valve to close one of said secondary ports.

In testimony whereof we have hereunto set our hands at Venice, California, this 6th day of June, 1917.

JOHN A. ECCLES.
BENJAMIN F. TOZIER.